United States Patent Office 3,481,781
Patented Dec. 2, 1969

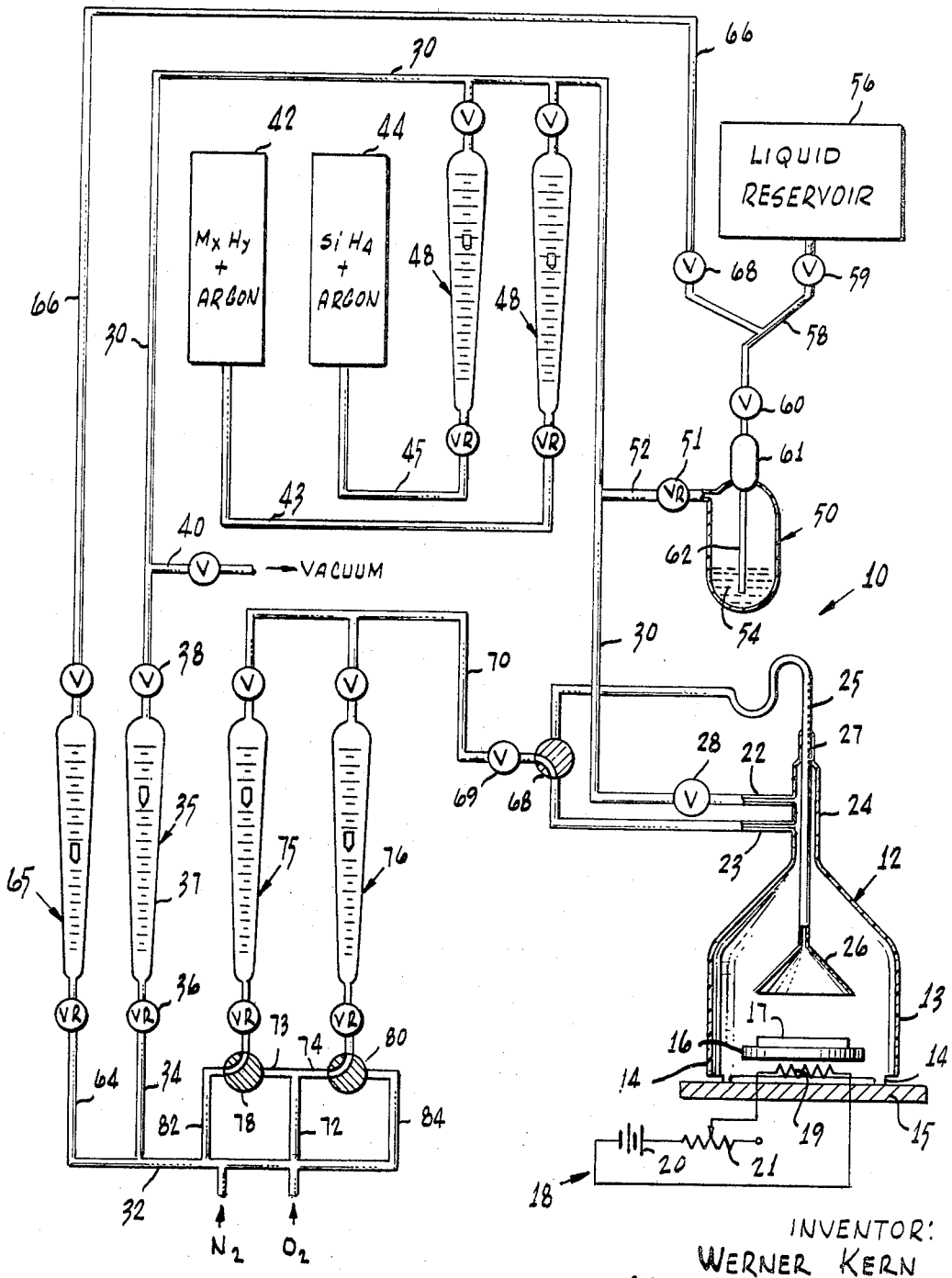

3,481,781
SILICATE GLASS COATING OF SEMICONDUCTOR DEVICES
Werner Kern, Belle Mead, N.J., assignor to RCA Corporation, a corporation of Delaware
Filed Mar. 17, 1967, Ser. No. 623,905
Int. Cl. C23c *13/04;* C23b *5/50*
U.S. Cl. 117—215                                    18 Claims

ABSTRACT OF THE DISCLOSURE

A silicate glass coating is synthesized by chemical vapor phase reaction on the surface of an object by heating the object to a temperature in the range of 300° C. to 600° C. in an atmosphere consisting of a mixture of an inert carrier gas, silane ($SiH_4$) as a source of silicon for silicon dioxide, other hydrides and/or alkyls as sources of ions for secondary oxides, and oxygen. For example, a borosilicate glass consisting of a mixture of silicon dioxide ($SiO_2$) and boron trioxide ($B_2O_3$) is synthesized from silane and diborane ($B_2H_6$), by oxidation of these hydrides at elevated temperature.

The thermal oxidation of a metal alkyl such as trimethyl aluminum may also be employed together with the hydride reactions to form, for example, ternary glass compositions, such as aluminoborosilicate glasses.

BACKGROUND OF THE INVENTION

The invention herein described was made in the course of or under a contract or subcontract thereunder with the Department of the Air Force. The invention relates to an improved process of forming a silicate glass coating on the surface of an object. More particularly, the invention pertains to a method of synthesizing such a coating on the surface of an article such as a semiconductor device.

In the manufacture of semiconductor devices such as diodes, transistors, integrated circuits and the like, it is usually necessary to provide some kind of protection against contaminants, such as moisture, which have a tendency to degrade the electrical operating characteristics of the devices. In the case of silicon devices, it is common practice to provide a passivating coating of silicon dioxide, usually by thermally oxidizing the surface of the silicon.

Thermally-grown silicon dioxide is not adequate by itself for the preservation and protection of silicon devices, because it is not sufficiently impervious to contaminants and lacks mechanical strength. In addition, it contains contact openings in the device area that are particularly susceptible to contamination from the ambient. Accordingly, oxide-protected devices are conventionally sealed in metal cans or embedded in polymeric plastic materials. These prior encapsulation techniques have been found to possess certain disadvantages. The metal can structures are expensive and occupy such large volumes that the advantage of small size provided by integrated circuit technology is lost. In the case of plastic encapsulants, it has been found that these materials also are not sufficiently impervious to contaminants. Moreover, these materials have often been found to act as contaminants themselevs.

Silicate glasses have been recognized by prior art as a class of materials which will solve most of these encapsulation problems. Various methods of applying silicate glass coatings to the surfaces of semiconductor devices have been proposed but have not met with substantial success. For example, fusion techniques are known in which the glass is applied to a surface as a powder and heated to a temperature above its softening point. The temperatures required for applying the coatings by these methods are often so high as to cause unacceptable variations in the structures of the devices being coated. Special low temperature glasses have been devised to meet this problem, but such glasses have often such high thermal coefficients of expansion that they are not entirely compatible with silicon devices. Other known techniques are reactive sputtering and radio frequency sputtering, but these must usually be restricted to simple glass compositions and the ratio of deposition are low.

SUMMARY OF THE INVENTION

It is an object of the present invention to provide a novel method of coating devices such as silicon semiconductor devices with glass films having compositions such that good sealing and protection of the devices may be attained. More particularly, it is an object of this invention to provide a novel method of applying protective, impervious, dielectric, silicate glass coatings to semiconductors device surfaces.

It is another object of this invention to provide a method of coating semiconductor devices with glass compositions at relatively low temperatures, in order to minimize deleterious effects such as oxidation of metal leads and excessive diffusion of doping impurities during processing. More particularly, it is an aim of the invention to synthesize glass compositions at temperatures well below the melting temperatures of the compositions.

Another object of the invention is to provide a method of synthesizing glass films by means of which the composition of the film may be easily controlled or varied during the deposition of the film, so that films having predetermined chemical and physical characteristics may be produced.

Another object of this invention is to provide a method of synthesizing glass films at reasonably high growth rates so as to minimize the time required to produce coatings of satisfactory thickness.

Still another object of the invention is to provide a method of producing a glass coating having highly uniform thickness over the exposed surface of a device, regardless of the shape of the device.

These objects are accomplished by synthesizing the desired glass constituents by oxidation of hydrides and alkyls of those elements that are desired as oxides in the glass. Briefly, the novel method inclueds the steps of:

(1) placing a substrate to be coated into a reaction zone and heating it to a predetermined temperature, and then (2) introducing the reactants in vapor form, in an inert carrier gas, into the reaction zone where they are oxidized and deposited onto the surface of the object. A densifying heat treatment may also be employed.

Silane is used in all of the reacting mixtures as a source of silicon for silicon dioxide. Other typical reactants are diborane, phosphine, the hydrides of antimony and bismuth, the alkyls of aluminum, and zinc and mixtures of such hydrides and alkyls.

DRAWING

The single figure of drawing illustrates a typical apparatus suitable for carrying out the present method.

DETAILED DESCRIPTION

As stated above, the present method includes the step of heating a substrate to be coated in a reaction zone to a predetermined temperature. The temperature required is one sufficient to cause thermal oxidation of the hydrides and alkyls of the cations desired in the oxidic constituents in a selected glass composition. The temperature at which the reactions are carried out will depend on the reactants selected, but will ordinarily be in the range of 300 to 600° C., a temperature around 450° C. being preferred for most compositions. Accordingly, the temperature is relatively low and most semiconductor devices may be coated without substantially altering their electrical properties. It should be noted that this is the temperature of the substrate material and that the temperature of the gases in the reacting ambient will be somewhat lower.

The reaction zone is normally maintained at or just slightly above atmospheric pressure and, as will be appreciated from the description of apparatus hereinafter, may comprise also a suitable means for delivering the reactant gases, in well mixed form, to the region surrounding the heated substrate.

Any suitable substrate material may be coated by this method. In particular, any of the material typically found in semiconductor devices, such as semiconductor crystals, monocrystalline or polycrystalline insulator materials, metals, and the like, may be coated. The substrate material will influence the choice of glass composition; that is, the glass composition should be chosen to have a thermal coefficient of expansion which matches as closely as possible the thermal coefficient of expansion of the substrate material. Where there are large differences in thermal coefficients, relatively thick layers cannot be made without cracking of the glass, although thin layers are achievable. For example, when pure silicon dioxide is deposited on silicon, cracks will begin to appear when the film is about 2.5 microns thick. The proper glass composition for coating a particular substrate may be determined empirically.

Glass compositions disclosed herein have been found to be especially suitable for encapsulating and protecting silicon semiconductor devices. In particular, these compositions are the borosilicate, phosphosilicate, aluminoborosilicate, and zinc borosilicate glasses. Other glass compositions of interest for silicon devices are antimony, bismuth, aluminum, and zinc silicates.

Silicon dioxide is a constituent common to all these glass compositions, and is obtained by the thermal oxidation of silane. To provide a combination of boron oxide and silicon dioxide, the starting materials are diborane and silane. If a phosphosilicate composition is desired, phosphorous pentoxide ($P_2O_5$) is the secondary glass constituent, and may be obtained from phosphine ($PH_3$). Bismuth silicate and antimony silicate glass compositions can be similarly achieved by combining the silicon dioxide with oxides derived from bismuth hydrides or antimony hydrides.

Metal alkyls may provide still other ions to yield more complex glass compositions, such as aluminoborosilicates and zinc borosilicates, for example. The alkyls can be oxidized, at the same temperatures as the hydrides. The lower alkyls are preferable for use in this process since they react to yield clean oxides. The higher alkyls often are incompletely oxidized to intermediate compounds such as metal alkoxides.

A preferred apparatus useful in carrying out the present method is designated generally by the numeral 10 in the drawing. The apparatus 10 includes a reaction chamber 12 having a generally bell-shaped glass housing 13 which is supported, as by depending feet 14, on a base 15 so as to be vented to the atmosphere.

Disposed within the lower portion of the housing 13 is a substrate holder 16 on which the object 17 to be coated is placed. Supporting structure for the substrate holder 16 has been omitted from the illustration. The substrate holder 16 may be stationary or movably supported, a movable support being preferred so as to continuously change the position of the object 17. This has been found to result in a more uniform coating.

A resistance heating device is employed in the apparatus 10 and is represented by a circuit 18 including a resistance heating element 19, near the substrate holder 16, a battery 20, and a control rheostat 21.

The reactant gases are supplied to the reaction chamber 12 through conduits 22 and 23 connected to the upper neck portion 24 of the housing 13, extending radially therefrom, or through a conduit 25 which extends axially into the housing 13 and terminates in a downwardly flaring funnel 26 at a position vertically above the object 17. The conduit 25 is movably mounted in a precision sliding joint 27 at the top of the housing 13, to enable adjustment of the vertical position of the funnel 26 with respect to the object 17. The introduction of the reactant gases laterally into the relatively small volume of the neck portion 24 of the housing 13 provides for efficient mixing of the gases before they reach the object 17. As the gases pass down toward the object 17 from the conduits 22 and 23, they will be deflected by the exterior surface of the funnel 26 and will then flow turbulently toward the object 17 from all of the radial directions of the housing 13.

The conduits 23 and 25 are alternative inlets for oxygen, and the conduit 22 constitutes the inlet for the gases to be oxidized. The conduit 22 is connected through a shut-off valve 28 to a main conduit 30. A carrier gas, for example nitrogen, is supplied to the upstream end of the conduit 30 from a nitrogen source, not shown, through a header 32, a branch conduit 34 and a regulating assembly 35. The regulating assembly 35 comprises a series combination of a precision regulator valve 36, a calibrated flow meter 37 and a shut-off valve 38. Each of the other regulating assemblies in the apparatus 10 comprises a similar series combination of regulator valve, flow meter, and shut-off valve, as shown.

A vacuum conduit 40 is connected into the main conduit 30 at a position just downstream of the regulating assembly 35, the vacuum conduit 40 being employed to aid in purging the system of undesired gases. Typically, the apparatus 10 is alternatively flushed with nitrogen and evacuated for this purpose.

The hydride reactants are gases at room temperature and are supplied to the main conduit 30 from pressurized storage tanks, illustrated at 42 and 44. These reactants are supplied commercially in diluted form, in an inert gas such as argon. One tank 42 contains a secondary hydride, indicated by the general symbol $M_xH_y$, which may be diborane or phosphine, for example. This gas is supplied through a connecting conduit 43 and a regulating assembly 48 to the main conduit 30. The other tank 44 contains silane and is connected to the main conduit 30 by means of a conduit 45 and a regulating assembly 46. When the various valves are opened, a mixture of nitrogen, silane and the other hydride will be delivered to the main conduit 30 of the regulating assembly 48.

Some of the metal alkyl reactants mentioned above are liquids at room temperature. To introduce these materials as vapors into the housing 13, a bubbler 50 is provided, which is connected into the main conduit 30 through a regulating valve 51 and a branch conduit 52. A charge of liquid 54 is provided in the lower end of bubbler 50. The liquid 54 is supplied from a liquid reservoir 56, which may be a commercial pressurized vessel containing the desired reactant liquid. The reservoir 56 is connected to the bubbler 50 by means of a conduit 58 provided with valves 59 and 60, a surge chamber 61 and a pipe 62 extending down into the bubbler 50 to a point normally below the surface of liquid 54.

Nitrogen, as a carrier gas for the vapors of liquid 54, is supplied to the bubbler 50 from the nitrogen source through the header 32, a branch conduit 64, a regulating assembly 65, a conduit 66, and then through a valve 68 to an intersection with the conduit 58 leading to the bubbler 50. When the regulating assembly 65 and the valves 68 and 60 are properly adjusted, nitrogen will flow through the surge chamber 61 and the pipe 62 and will be bubbled through the liquid 64, thus entraining its vapor. The vapor-nitrogen mixture will then pass from the bubbler through the conduit 52 into the main conduit 30 where it will be mixed with the other gases coming from the hydride tanks 42 and 44.

As stated above, the conduits 23 and 25 are alternative oxygen inlets. One or the other of these conduits may be used depending on the particular glass composition which is being formed. For some compositions, it is preferable to mix the oxygen with the other reactants in the neck portion 24 of the housing 13, and, for this purpose, the conduit 23 would be employed. For other compositions, better results are obtained when the oxygen is introduced into the reaction chamber at a location closer to the object 17, and for this the conduit 25 and the funnel 26 would be employed. The conduits 23 and 25 are connected through a three-way valve 68 and a shut-off valve 69 to an oxygen conduit 70, three-way valve 68 allowing for selection of the desired conduit 23 or 25.

In the synthesis of some glass compositions, it is desirable to maintain the total volume of gas flowing into the housing 13 at a substantially constant level, while varying the amount of oxygen available. For this purpose, the system is arranged so that the oxygen is diluted with nitrogen before it is introduced into the conduit 70, this arrangement allowing for the regulation of the ratio of oxygen to nitrogen. To this end, oxygen is supplied from a suitable source, not shown, through a conduit 72 and two branch conduits 73 and 74 to a pair of regulating assemblies 75 and 76, which are constructed so as to supply gas at a relatively low rate and a relatively high rate, respectively. The branch conduits 73 and 74 are connected to the regulating assemblies 75 and 76 through respective three-way valves 78 and 80, which enable alternative connection to the aforementioned nitrogen source through a pair of conduits 82 and 84. Thus, with the three-way valves 78 and 80 in the positions shown, nitrogen is supplied through the low rate assembly 75 and oxygen is supplied through the high rate assembly 76, to provide an oxygen-nitrogen mixture in which the major ingredient is oxygen. When the three-way valves 78 and 80 are moved to their alternative position, oxygen is supplied through the low rate assembly 75 and nitrogen is supplied through the high rate assembly 76, and the resulting mixture is predominantly nitrogen. Thus, by proper adjustment of the regulating assemblies 75 and 76, a constant volume of oxygen-nitrogen mixture may be supplied, with wide variations in the proportions of the two constituents.

OPERATION

It should be noted that, when the present process is carried out for the purpose of encapsulating semiconductor devices which include layers of metal, certain precautions should be observed just prior to the deposition of the encapsulating glass layer. First, the object to be coated should be heated to the deposition temperature in the absence of oxygen to prevent the device metallization from oxidizing. Second, the reactants should be introduced into the reaction chamber in the correct sequence, so as to avoid the formation of oxygen-deficient films. With respect to the second condition, if diborane and silane are introduced into the reaction chamber in the presence of only trace amounts of oxygen, a poorly insulating film will result. The sequence of gas introduction as follows will prevent the formation of such oxygen-deficient films.

The heating circuit 18 is first actuated to bring the system up to the usual deposition temperature, that is, about 450° C. The regulating assembly 35 is then turned on so as to deliver nitrogen to the interior of the housing 13, the rate of nitrogen flow being adjusted to such a value that the pressure within the housing 13 is slightly higher than atmospheric pressure so that flow of atmospheric air into the housing 13 is not possible. The housing 13 is then lifted briefly from its support, the object 17 is placed on the substrate holder 16, and the housing 13 is replaced.

After the desired temperature has been reached, the flow rate of nitrogen through the regulating assembly 35 is adjusted to the value desired during the glass deposition. The silane regulating assembly 46 is next opened. At the working temperature and in the absence of oxygen, no deposit will form on the surface of the object 17.

After a short time, about 20 seconds, of silane flow, the oxygen flow is begun. As mentioned above, oxygen is supplied to the housing 13 through either the side conduit 23 or the funnel 26 depending upon the particular glass composition which is being formed. When the gases are introduced in this sequence, the oxygen will react with the silane before it can oxidize any metal which may be present in the object 17.

Because the borosilicate and phosphosilicate glasses considered herein contain elements which can act as conductivity modifiers in silicon, it is recommended that a base layer of silicon nitride or silicon dioxide be first provided as a diffusion barrier on the surface of the object 17 if that object is silicon. To this end, for example, silane and oxygen may conveniently be supplied alone to the reaction chamber 12 for a time sufficient to form a barrier layer of about one micron in thickness.

After the base layer of silicon dioxide has been grown to the desired thickness, a binary or ternary glass encapsulating layer may be added as follows. The regulating assembly controlling the introduction of the secondary oxide component for a binary glass composition is actuated at the time that the silicon dioxide layer reaches the desired thickness. The impotrant requirement here is that sufficient oxygen be flowing into the reaction chamber to oxidize both the silane and the secondary reactant to the desired degree. If such is not the case, a poorly insulating film may form.

For ternary glass compositions, the metal alkyl reactant is introduced right after the flow of the secondary constituent is begun.

The flow rates of the various constituents will control the proportions of the constituents of the reactant mixture and, consequently, the proportions of the oxide constituents of the glass. Tables I and II give the flow rate data for several typical glass compositions which may be formed by the present method. Table I contains flow rate data for the reactants and Table II contains flow rate information for the oxygen and nitrogen flow through the respective regulating assemblies 75 and 76.

Nitrogen carrier gas is supplied through the regulating assembly 35 at about 1900 cubic centimeters per minute (cm.$^3$/min.) in each of the cases given and the substrate temperature is maintained at a temperature between 450 and 475° C. in all cases. Deposition of the films ordinarily takes place at a rate between 800 and 1200 angstrom units per minute. Glasses of good quality have been achieved under these conditions in all of the examples given.

If no adjustment of the regulating assemblies is made during the process, a uniform coating is produced. The various regulating assemblies may be adjusted during the coating process, however, to vary the structure of the glass film as it is formed. An example of this, which has already been given, is the formation of a diffusion barrier of silicon dioxide between the final encapsulating silicate glass layer and the object being coated. Thus, distinct layers of glass of different composition may be added as desired by varying the proportions of the reacting gases discontinuously, that is, by adding or subtracting constituents at predetermined times.

Apparatus 10 may also be operated in such a way as to vary the glass composition in a gradual manner. For this purpose, the various regulating assemblies are continuously adjusted during the deposition of the glass layer according to some prearranged program.

In terminating the process, regardless of variations in the flow rates during the deposition period, the sequence of terminating the flow of components should be as follows. First, if diborane or phosphine is a secondary constituent, its gas supply is always terminated first, followed by the metal alkyl and then the silane. The flow of oxygen is terminated a short time after the last gaseous reactant is stopped. Ordinarily, the flow of nitrogen through regulating assembly 35 is then increased to purge the system of residual gases.

The glass compositions formed as described above are satisfactory without further treatment for many purposes. It has been found, however, that certain of these glass compositions will devitrify if they are subjected to conditions of high temperature and high humidity. Since such conditions are often encountered in the operation of semiconductor devices, it is advisable to modify the glasses to avoid the problem. This can be accomplished by a post-deposition heat treatment, as follows:

After a glass coating is deposited on an object, the object is placed in a suitable furnace and heated for a time and at a temperature sufficient to produce a change in the physical structure of the glass, manifested by a densification and a decreased solubility thereof. In general, the temperature should be as high as possible without adversely affecting the metallization of the device or without causing undesired additional diffusion of impurities in the semiconductor. Ordinarily, the heat treatment temperature need not exceed 900° C.

At high temperatures, the densification of the glass takes place quite rapidly, so that only short treatment times are required. If it is necessary to keep the temperature low in order to avoid changes in the internal structure, of the coated object, the treatment must be carried out for longer times.

As one illustration of this post-deposition heat treatment, the etch rate of a standard borosilicate glass composition, like the medium borosilicate glass given in Table I, in a buffered etching solution was measured and etching was found to take place at the rate of about 7 A. per second. The etching solution comprised a mixture of 454 g. of ammonium fluoride, 680 ml. of distilled water, and 163 ml. of 49% hydrofluoric acid solution. The coated device was then heated at a temperature of 850° C. for a period of 10 minutes and an etch rate measurement was again made. The etch rate after heat treatment was about 4 A. per second, showing that the glass had been densified by the heat treatment.

TABLE II.—FLOWRATES OF OXYGEN AND DILUTING NITROGEN FOR THE GLASS COMPOSITIONS OF TABLE I

[Cm.³/min. at 15 p.s.i., 24° C.]

| Glass Composition | Oxygen through side conduit 23 | Nitrogen through side conduit 23 | Oxygen through funnel 26 | Nitrogen through funnel 26 |
|---|---|---|---|---|
| I. Silicon dioxide | 90 | 0 to 10 | | |
| II. High borosilicate | 138 | | | |
| Medium borosilicate | 123 | | | |
| Low borosilicate | 108 | | | |
| Phosphosilicate | | | 90 | 0 to 10 |
| Aluminosilicate | 90 | 0 to 10 | | |
| Zinc silicate | 90 | 0 to 10 | | |
| III. Alumina borosilicate | 123 | 0 | | |
| Zinc borosilicate | 123 | 0 | | |

What is claimed is:

1. A method of forming a silicate glass coating on the surface of an object comprising the steps of heating said object while contacting said surface with a vaporous mixture of an inert gas, silane, oxygen, and at least one reactant selected from the group consisting of the hydrides of boron, phosphorous, antimony, and bismuth, the alkyls of aluminum and zinc, and mixtures of such hydrides and alkyls, said heating being to a temperature such that said silane and said reactant are oxidized and the resulting oxides interact to form a glass coating which is deposited on said surface.

2. A method of forming a silicate glass coating as defined in claim 1 wherein said vaporous mixture contains said silane, said oxygen and said reactant in such proportions that said coating is a composition having a thermal coefficient of expansion substantially equal to that of said object.

3. A method of forming a silicate glass coating as defined in claim 1 wherein said reactant is diborane.

4. A method of forming a silicate glass coating as defined in claim 1 wherein said reactant is phosphine.

5. A method of forming a silicate glass coating as defined in claim 1 wherein said reactant is a mixture of diborane and trimethyl aluminum.

6. A method of forming a silicate glass coating as defined in claim 1 wherein said reactant is a mixture of diborane and diethyl zinc.

7. A method of forming a silicate glass coating as defined in claim 1 wherein said reactant is antimony hydride.

8. A method of forming a silicate glass coating as defined in claim 1 wherein said reactant is bismuth hydride.

9. A method of forming a silicate glass coating as defined in claim 1 wherein said reactant is trimethyl aluminum.

10. A method of forming a silicate glass coating as defined in claim 1 wherein said reactant is diethyl zinc.

11. A method of forming a silicate glass coating as defined in claim 1 wherein said substrate is heated to a temperature in the range of about 300° C. to about 600° C.

12. A method of forming a silicate glass coating as defined in claim 1, including the further step of heating said object for a time and at a temperature sufficient to densify said glass coating.

13. A method of forming a silicate glass coating as defined in claim 1 further comprising the step, prior TABLE I.—GAS FLOWRATES OF REACTANTS USED FOR SYNTHESIZING TYPICAL GLASS COMPOSITIONS

[Cm.³/min. at 15 p.s.i., 24° C.]

| Glass Composition | 10% $SiH_4$ in Argon | 10% $B_2H_6$ in Argon* | 10% $PH_3$ in Argon | Nitrogen through $Al(CH_3)_3$ | Nitrogen through $Zn(C_2H_5)_2$ |
|---|---|---|---|---|---|
| I. Silicon dioxide | 40 | | | | |
| II. High borosilicate | 40 | 20 | | | |
| Medium borosilicate | 40 | 13.3 | | | |
| Low borosilicate | 40 | 6.8 | | | |
| Phosphosilicate | 40 | | 7.5 | | |
| Aluminosilicate | 40 | | | 80 | |
| Zinc silicate | 40 | | | | 80 |
| Lead silicate | 40 | | | | |
| III. Alumino borosilicate | 40 | 13.3 | | 80 | |
| Zinc borosilicate | 40 | 13.3 | | | 80 |

*Diborane source tank was approximately 1 year old.

to the aforementioned heating step, of heating said object while contacting said surface with a vaporous mixture of an inert gas silane, and oxygen whereby a layer of silicon dioxide is deposited as the first layer on said surface.

14. A method of forming a silicate glass coating as defined in claim 1 wherein the proportions of said inert gas, said silane, said oxygen, and said reactant are varied during the deposition of said coating whereby said coating has layers of different composition.

15. A method of forming a silicate glass coating as defined in claim 14 wherein said proportions are varied discontinuously whereby distinct layers are formed in said coating.

16. A method of forming a silicate glass coating as defined in claim 14 wherein said proportions are varied continuously whereby the composition of said coating changes gradually throughout the thickness thereof.

17. A method of forming a silicate glass coating on the surface of an object comprising, in sequence, the steps of:
- heating said object in a reaction chamber in an atomsphere of flowing nitrogen to a temperature between about 300° C. and about 600° C.,
- admitting silane into said chamber at a predetermined flow rate,
- admitting oxygen into said chamber at a predetermined flow rate,
- admitting a reactant selected from the group consisting of the hydrides of boron, phosphorous, antimony and bismuth, the alkyls of aluminum and zinc and mixtures of such hydrides and alkyls into said chamber at a predetermined flow rate, and
- after a predetermined time, discontinuing the flow of said reactant, said silane, said oxygen, and said nitrogen.

18. A method of forming a silicate glass coating as defined in claim 17 wherein said reactant is a hydride-alkyl mixture, the flow of the hydride component of said mixture being started before the flow of the alkyl component thereof and being discontinued before the flow of the alkyl component is discontinued.

References Cited

UNITED STATES PATENTS

| | | | |
|---|---|---|---|
| 3,019,137 | 1/1962 | Hawlet | 117—106 |
| 3,117,832 | 1/1964 | Sterling | 23—182 |
| 3,228,812 | 1/1966 | Blake | 117—106 X |
| 3,306,768 | 2/1967 | Peterson | 117—201 X |
| 3,330,694 | 7/1967 | Black et al. | 117—201 |
| 3,396,052 | 8/1968 | Rand | 117—201 |

ANDREW G. GOLIAN Primary Examiner

U.S. Cl. X.R.

117—69, 106, 201